Figure 3:
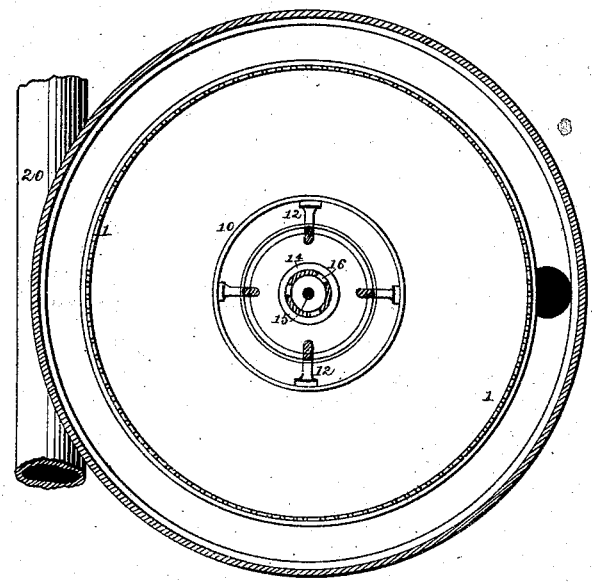
Figure 4:
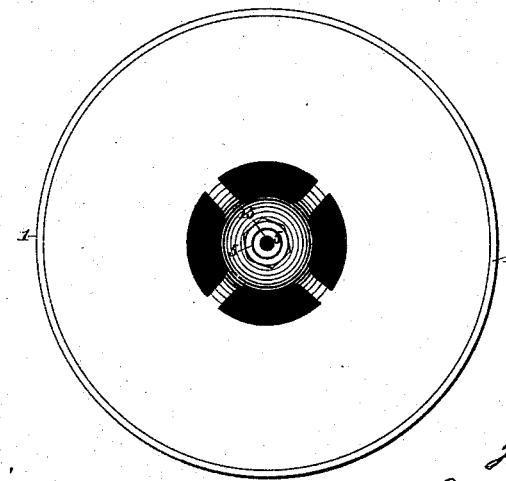

2 Sheets—Sheet 1.
H. W. WALKER & T. L. PATTERSON.
Centrifugal Machine for Purifying and Refining Sugar.
No. 209,309.  Patented Oct. 22, 1878.
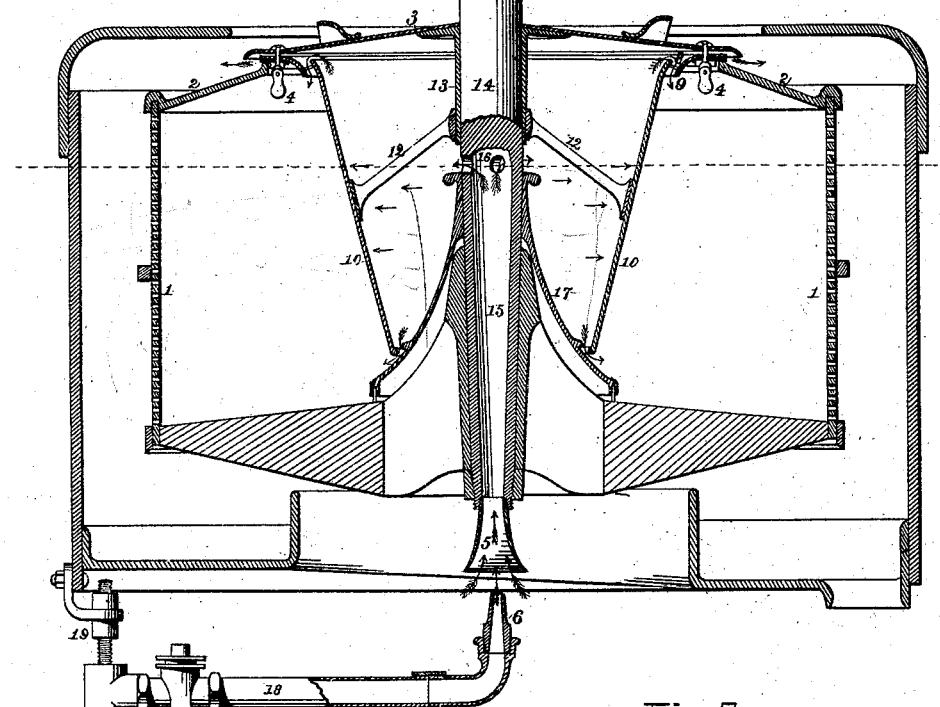
Fig. 1.
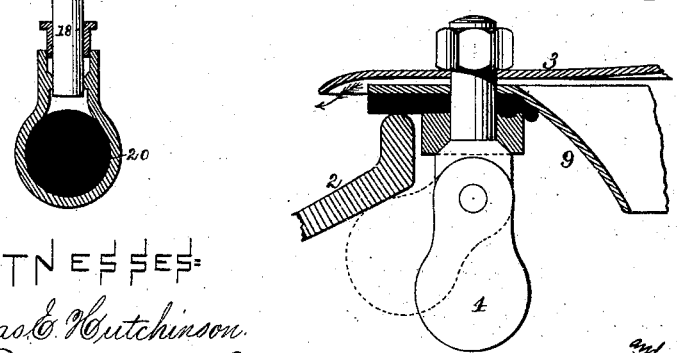
Fig. 2.
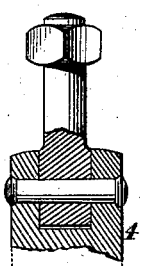
Witnesses:
Jas. E. Hutchinson
Pennington Halsted
Inventors:
Hugh William Walker
and Thomas Law Patterson
by John J. Halsted, Atty.

2 Sheets—Sheet 2.

H. W. WALKER & T. L. PATTERSON.
Centrifugal Machine for Purifying and Refining Sugar.
No. 209,309. Patented Oct. 22, 1878.

WITNESSES:
Jas. E. Hutchinson.
Pennington Halsted.

INVENTORS.
Hugh William Walker
and Thomas Law Patterson
by John J. Halsted,
Atty.

UNITED STATES PATENT OFFICE.

HUGH W. WALKER AND THOMAS L. PATTERSON, OF GREENOCK, NORTH BRITAIN.

IMPROVEMENT IN CENTRIFUGAL MACHINES FOR PURIFYING AND REFINING SUGAR.

Specification forming part of Letters Patent No. 209,309, dated October 22, 1878; application filed September 12, 1878; patented in England, January 22, 1877.

*To all whom it may concern:*

Be it known that we, HUGH WILLIAM WALKER and THOMAS LAW PATTERSON, both of Greenock, in the county of Renfrew, North Britain, have invented certain new and useful Improvements in Centrifugal Machines for Purifying or Refining Sugar, for which we have obtained a patent in England, sealed January 22, 1878, No. 2,924 for the year 1877; and we do hereby declare that the following is a full, clear, and exact description of the invention, which will enable others skilled in the art to which it appertains to make and use the same, reference being had to the accompanying drawings, and to letters of reference marked thereon, which form a part of specification.

Our invention has for its object to improve the construction and action of centrifugal apparatus used for carrying out the known process of treating sugar with a mixture of steam and air for the purpose of purifying or refining the same.

We apply our improvements to a centrifugal machine of the kind known as "suspended and over-driven." We make the lower end of the shaft hollow, and with a trumpet-like or enlarged mouth, and below this mouth we place the nozzle of a branch steam-pipe, so that a jet of steam may be directed into the hollow shaft. This steam-jet carries air in along with it, the mixture of air and steam being thus formed within the centrifugal machine, and in a very convenient manner. The mixture of steam and air issues through perforations in the hollow part of the shaft at a level near the top of the basket, and first enters a central space inclosed by a conical shell, which is wider at its upper part, the mixture finding its way above the top edge of the conical shell, and also beneath its bottom edge, into the space more or less occupied by the sugar to be operated upon.

The conical shell is connected to a cover, which, as well as the conical shell, rotates with the basket; but this cover and the conical shell can be raised by sliding on the shaft when charging sugar into the basket.

The cover and the conical shell are specially devised for getting rid of any water due to condensation of the steam within the basket, and immediately before the mixture of steam and air acts on the sugar.

We are aware that in previous attempts to purify sugar by the action of a mixture of steam and air in the centrifugal machine devices for separating water due to condensation have been used or proposed; but such earlier devices have either been external to the cover or on other accounts not thoroughly effective.

With our improved apparatus the water due to condensation is thrown out by centrifugal action from the edge of the cover. The cover has attached to its under side a curved annular plate, with openings left all round between it and the cover for the egress of the water, and this annular plate has its inner edge below the top or lip of the conical shell, so that the moisture thrown upon the inside of the conical shell, and which, in consequence of the centrifugal force, runs to the wider and upper part of the shell, passes out between the annular plate and the cover, as well as the moisture, which, being condensed on the inside of the cover, is also thrown outward by the centrifugal force.

We employ self-acting fasteners for securing the cover in its place while the machine is running. These fasteners are simple pieces of metal loosely hinged to the cover, and which, when the machine is not in motion, hang downward clear of the top annular rim of the basket, and do not obstruct the lifting of the cover; but when the basket is rotating the centrifugal force makes these fasteners turn outward and bear up against the under side of the rim of the basket and clip such rim between them and the edge of the cover, which rests on the upper side of the rim.

Figure 1 of the accompanying drawings is a vertical section, and Fig. 2 is a horizontal section, of an over-driven suspended centrifugal machine as fitted with our improved apparatus.

The top edge of the basket 1 is constructed in the usual manner, with an annular rim or plate, 2, projecting inward a short distance from the sides of the basket. For the space within the rim 2, there is provided a cover, 3, of sheet metal, which, when a charge of sugar is being operated upon, rotates with the basket, its outer edge resting upon the inner edge of the annular rim 2, the joint being made sufficiently tight by a lining of rubber, which is fixed on the under side of the edge of the cover, as is best seen in the enlarged detailed figure. The cover 3 is secured in its place when the basket is rotating by small weighted holders 4, hinged loosely to the under side of the cover, which holders, when the basket is rotating, are by the centrifugal force made to turn outward and upward against the under side of the basket-rim 2, and thereby bind the cover firmly down to that rim. These holders 4 have the advantage of requiring no manipulation, as when the basket is not rotating they hang downward clearly within the rim 2, and do not interfere with the placing or removal of the cover 3.

The shaft 14 is made with its lower part 15 hollow, and at the bottom end there is fitted a mouth-piece, 5, into which a nozzle, 6, on a branch steam-pipe, 18, directs a jet of steam in a manner to cause a quantity of air to enter along with it. The mixture of steam and air issues out of the hollow part 15 of the shaft 14 by holes 16 into a central space inclosed by a conical shell, 10, which is attached by arms 12 to a sleeve or tube, 13, sliding on the shaft 14, and having the cover 3 fixed to it.

Moisture due to condensation of part of the steam becomes deposited on the inside of the cover 3, and also on the inside of the conical shell 10, and in both cases the centrifugal force causes such moisture to run toward the outer or larger parts—that is, in the case of the conical shell 10, toward its upper and larger end.

The moisture from both the cover 3 and the conical shell 10 passes into a kind of annular pocket formed by a curved annular plate, 9, which is attached to the under side of the cover 3, and from this annular pocket the moisture or water of condensation escapes by openings to the outside of the cover 3 and over the rim 2 of the basket, and is thus prevented from reaching the sugar in the basket.

A convenient way of forming the openings is by inserting radial strips of metal between the edge of the cover 3 and the ring or annular plate 9, so as to leave small passages when attaching the latter by riveting or otherwise. The inner edge of the ring 9 is lower than the top edge of the conical shell 10, so as to catch the moisture thrown outward; but the parts do not touch, and the mixture of steam and air passes over the top edge of the conical shell 10, and down between it and the ring 9 into the space more or less occupied by the sugar. Some of the mixture of steam and air also passes under the bottom edge of the conical shell 10.

The parts of the apparatus not hereinbefore referred to or affected by our improvements may be made as in any suitable existing centrifugal apparatus.

In using our improved apparatus we charge the sugar into the basket in the condition of a magma, made, by preference, in the following manner: The sugar is first, if necessary, reduced by crushing to a uniform condition, and is then mixed with sirup obtained from sugar previously treated in our improved apparatus hereinbefore described, or with low sirup or molasses obtained from raw or more or less refined sugars, such as "jelly" or "bastards," or the coarse products of the refinery, or with sirups obtained by concentrating "char-water" or other sweet water, the mixture being made in such proportion as to form a thick magma resembling *masse cuite*. The sugar and sirup should be well mixed in any convenient apparatus. The sugar-magma having been placed in the centrifugal machine and the cover adjusted in position, the machine is set in motion, and when the sirup is considered to be completely discharged, or nearly so, the steam-jet is turned on. The supply of steam is kept up until the sirup running from the machine is sufficiently colorless. The steam is then shut off, the machine is stopped, and the sugar, which is then in a purified but soft state, is discharged. If it is wished to have the sugar in a hard condition, the rotation of the machine must be continued after shutting off the steam for a sufficient time—say five minutes—when the sugar will be found caked to the sides of the basket.

What we claim as our invention is—

1. In an overhead-suspended centrifugal machine, the shaft made hollow at its lower end and provided with a mouth-piece, 5, for the introduction of a jet of steam, and air taken in by the steam at the mouth-piece, and provided with holes in the upper end of the hollow part of the shaft for the issue of the mixture of steam and air into the basket, in combination with a conical shell which is wider at the top, and which leads deposited moisture upward to top outlets, through which, also, the moisture from the cover passes, all substantially as and for the purposes hereinbefore described.

2. The improved means within the basket for removing water of condensation from the mixture of steam and air as near as possible to the points of application of the steam and air, such means consisting of the conical shell, with its wider upper end combined with the cover, and with the annular ring 9, attached to the cover, leading off by the same outlets the moisture from both shell and cover, substantially as hereinbefore described.

3. In a centrifugal machine, the weighted holders loosely hinged to the cover, in combination with the rim of the basket, the holders being adapted to be turned outward by centrifugal force and to catch against the under side of the basket-rim, for the purpose of fastening the cover to the basket, as hereinbefore described.

HUGH WILLIAM WALKER.
   THOMAS LAW PATTERSON.

Witnesses:
 WILLIAM BLACK, Jr.,
 JOHN NOBLE.